(12) United States Patent
Chang et al.

(10) Patent No.: US 7,743,468 B2
(45) Date of Patent: Jun. 29, 2010

(54) HINGE ASSEMBLY

(75) Inventors: Jung-Bin Chang, Shulin (TW); Shun-Yu Hung, Shulin (TW)

(73) Assignee: Shin Zu Shing Co., Ltd., Shulin, Taipei Hsien (TW)

( * ) Notice: Subject to any disclaimer, the term of this patent is extended or adjusted under 35 U.S.C. 154(b) by 392 days.

(21) Appl. No.: 11/979,988

(22) Filed: Nov. 13, 2007

(65) Prior Publication Data
US 2009/0121094 A1    May 14, 2009

(51) Int. Cl.
*E05D 11/06*    (2006.01)
(52) U.S. Cl. .............................. 16/374; 16/367; 16/371; 16/376
(58) Field of Classification Search .................... 16/367, 16/371, 374, 376, 377, 363, 375, 347; 455/575.3; 361/679.06, 679.07, 679.11, 679.12, 679.15, 361/679.16, 679.2, 679.27, 679.28; 439/165, 439/31, 467
See application file for complete search history.

(56) References Cited
U.S. PATENT DOCUMENTS
7,036,186 B2 * 5/2006 Jeong et al. .................... 16/303

| | | | |
|---|---|---|---|
| 7,155,781 B2 * | 1/2007 | Yamada et al. ................. | 16/367 |
| 7,603,748 B2 * | 10/2009 | Hsu et al. ..................... | 16/367 |
| 2006/0021195 A1 * | 2/2006 | Yamada et al. ................. | 16/367 |
| 2008/0047105 A1 * | 2/2008 | Chang et al. .................. | 16/374 |

* cited by examiner

Primary Examiner—Victor Batson
Assistant Examiner—Jeffrey O'Brien
(74) Attorney, Agent, or Firm—Bacon & Thomas, PLLC

(57) ABSTRACT

A hinge assembly is used in a notebook computer and has a combination bracket, a keyed shaft, a stationary bracket, a limiting assembly and a pressing assembly. The notebook computer has a monitor panel and a base. The monitor panel is mounted horizontally pivotally upon the base. The combination bracket is attached to the monitor panel. The keyed shaft is attached securely to the combination bracket. The stationary bracket is mounted rotatably around the keyed shaft and is mounted securely on the base. The limiting assembly is mounted rotatably on the stationary bracket, is connected to the keyed shaft and allows the keyed shaft to rotate 360°. The pressing assembly is mounted around the keyed shaft below the stationary bracket to provide friction. Consequently, the hinge assembly allows the monitor to rotate 360° relative the base.

7 Claims, 5 Drawing Sheets

HINGE ASSEMBLY

BACKGROUND OF THE INVENTION

1. Field of the Invention

The present invention relates to a hinge assembly, and more particularly to a hinge assembly attaching a monitor panel to a base of a notebook computer.

2. Description of the Prior Arts

Notebook computers are designed to be more and more convenient and to have structural features to add preferred operational functions.

One type of conventional notebook computer has a horizontally rotatable monitor panel relative to its base to provide a capability to exhibit or to show the monitor to people behind the monitor panel. However, the kind of the conventional notebook computer is only designed to allow its monitor panel to horizontally rotate clockwise or counterclockwise a limited angle. Consequently, a person using the notebook computer needs to rotate the monitor panel in the opposite direction to close the monitor panel or continue typing on the notebook computer after showing it to people behind the monitor panel. Even when the monitor panel is rotated more then 180°, the monitor panel must be rotated in the opposite direction to its original position. Not being able to return the monitor panel to its original position directly by continuing to rotate it in the initial direction to reach 360° can be awkward.

To overcome the shortcomings, the present invention provides a hinge assembly to mitigate or obviate the aforementioned problems.

SUMMARY OF THE INVENTION

The primary objective of the present invention is to provide a hinge assembly that allows a monitor screen of a notebook computer to rotate horizontally 360° relative to a notebook computer's base.

The hinge assembly in accordance with the present invention is used in a notebook computer having a monitor panel and a base and has a combination bracket, a keyed shaft, a stationary bracket, a limiting assembly and a pressing assembly. The combination bracket is attached to the monitor panel. The keyed shaft is attached securely to the combination bracket. The stationary bracket is mounted rotatably around the keyed shaft and is mounted securely on the base. The limiting assembly is mounted rotatably on the stationary bracket, is connected to the keyed shaft and allows the keyed shaft to rotate 360°. The pressing assembly is mounted around the keyed shaft below the stationary bracket to provide friction. Consequently, the hinge assembly allows the monitor panel to rotate 360° relative the base.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
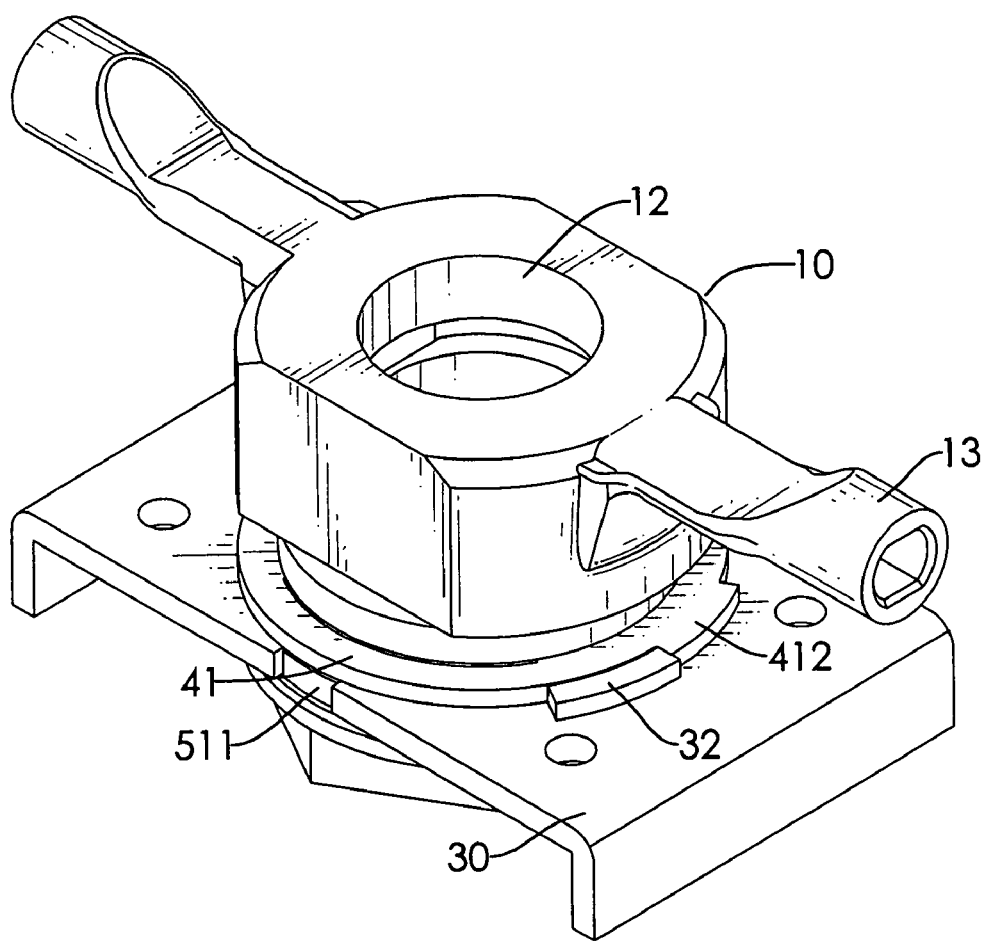
FIG. 1 is a perspective view of a hinge assembly in accordance with the present invention.
Figure 2:
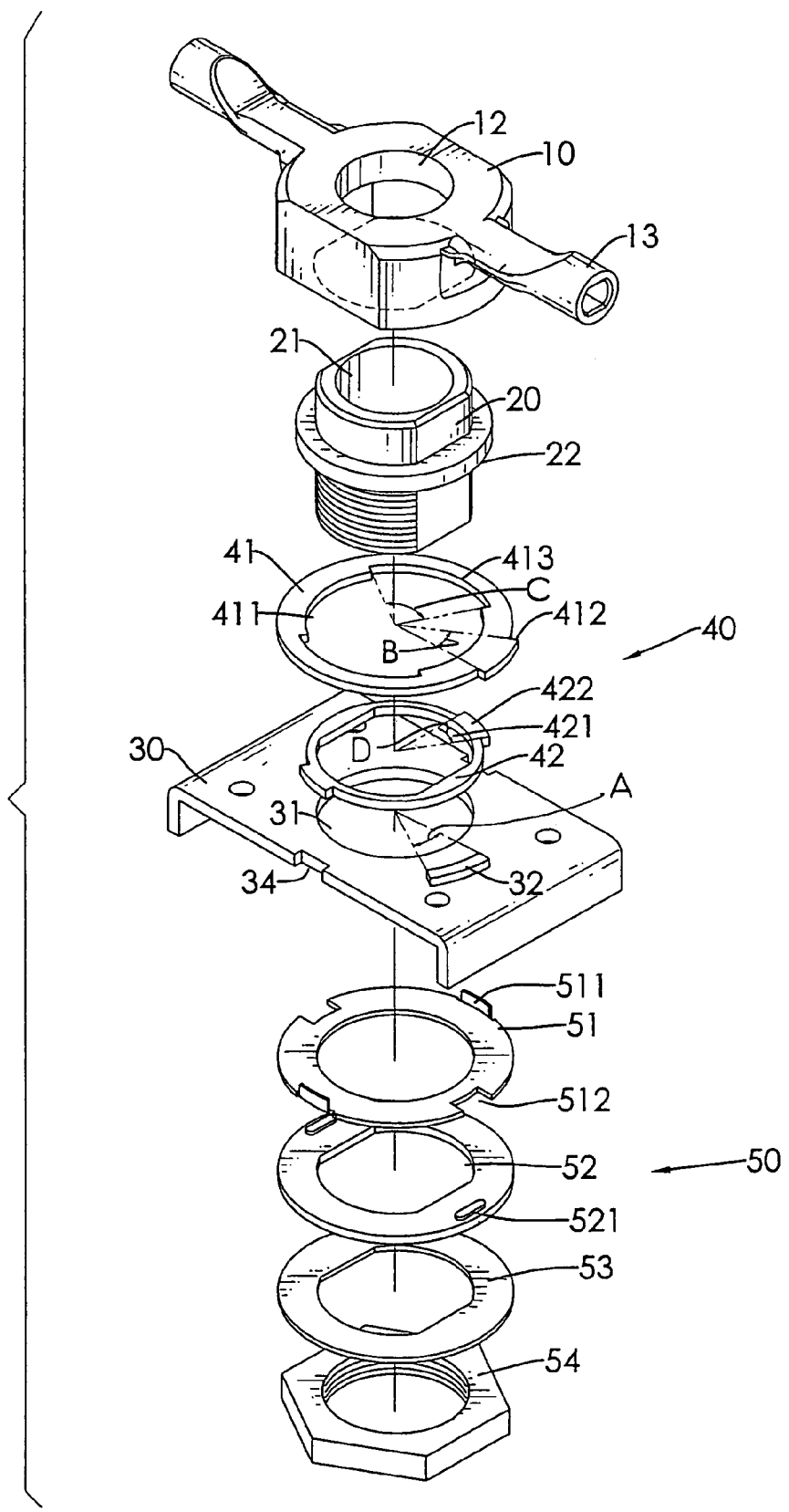
FIG. 2 is an exploded perspective view of the hinge assembly in FIG. 1.

With reference to FIGS. 1 and 2, a hinge assembly in accordance with the present invention is used in a notebook computer comprising a monitor panel and a base to allow the monitor panel to pivot vertically and rotate horizontally relative to the base. The hinge assembly comprises a combination bracket (10), a keyed shaft (20), a stationary bracket (30), a limiting assembly (40) and a pressing assembly (50).

Figure 3:
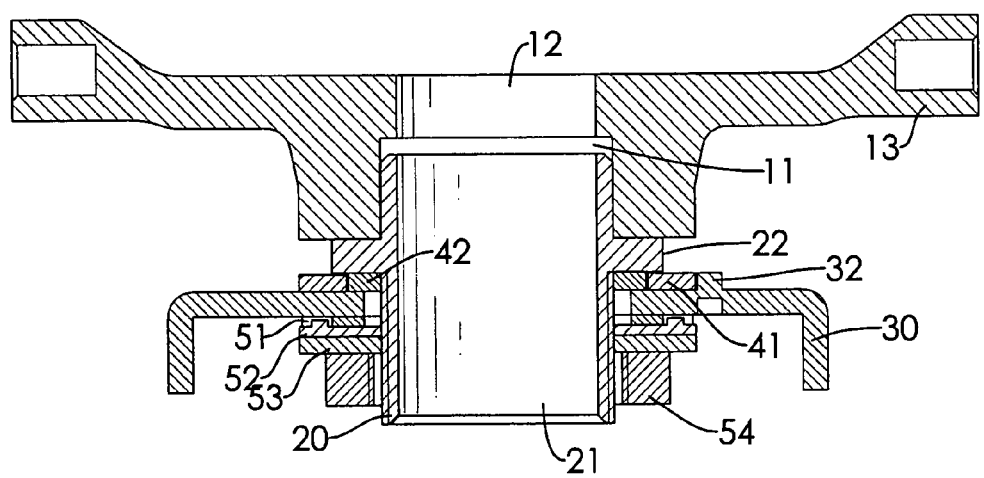
FIG. 3 is a cross-sectional front view of the hinge assembly in FIG. 1.

With further reference to FIG. 3, the combination bracket (10) is attached to the monitor panel of the notebook computer, has a top, a bottom, two sides, an optional keyed recess (11) and an optional opening (12) and may have two pivot arms (13).

The keyed recess (11) is formed in the bottom of the combination bracket (10).

The opening (12) is formed in the top of the combination bracket (10) and communicates with the keyed recess (11).

The pivot arms (13) are formed respectively on and protrude from the sides of the combination bracket (10) diametrically opposite to each other and are attached pivotally to the monitor panel to allow the monitor panel to pivot on the pivot arms.

The keyed shaft (20) is attached securely below and protrudes down from the combination bracket (10) and has an upper end, a lower end, a middle, an optional through hole (21) and an optional flange (22).

The upper end of the keyed shaft (20) may be mounted in and engage the keyed recess (11).

The lower end of the keyed shaft (20) may be threaded.

The through hole (21) is formed longitudinally through the keyed shaft (20) and communicates with the opening (12) of the combination bracket (10).

The flange (22) is formed around and protrudes radially from the middle of the keyed shaft (20) and has a bottom surface.

The stationary bracket (30) is mounted rotatably around the keyed shaft (20), is attached securely to the base of the notebook computer to allow the monitor panel to rotate relative to the base, has a top surface, two edges, a pivot hole (31) and a limit (32) and may have at least one mounting notch (34).

The pivot hole (31) is formed through the stationary bracket (30) and is mounted rotatably around the lower end of the keyed shaft (20).

The limit (32) is formed on and protrudes up from the top surface of the stationary bracket (30), is curved and concentric with the pivot hole (31) and has a first angle (A).

Each mounting notch (34) is formed in one of the edges.

Figure 4:
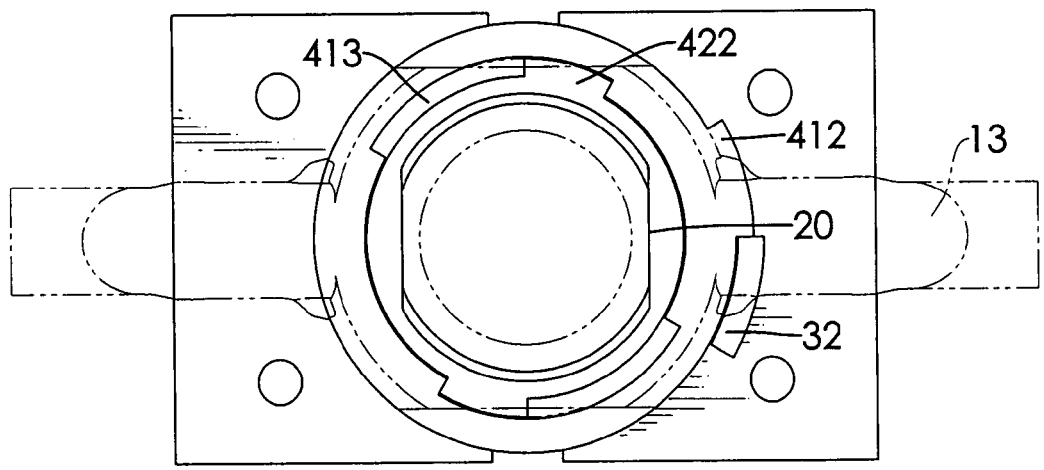
FIG. 4 is an operational top view of rotating elements and associated limits and stops of the hinge assembly in FIG. 1.

With further reference to FIG. 4, the limiting assembly (40) is mounted rotatably around the keyed shaft (20) against the top surface of the stationary bracket (30), may abut the bottom surface of the flange (22), corresponds to and selectively abuts the limit (32) to limit rotation of the monitor panel and has a limiting ring (41) and a driving ring (42).

The limiting ring (41) is mounted around the keyed shaft (20) against the top surface of the stationary bracket (30), may abut the bottom surface of the flange (22) and has an outer edge, a through hole (411), a second state stop (412) and at least one first stage limit notch (413).

The through hole (411) is formed concentrically through the limiting ring (41), is mounted rotatably around the keyed shaft (20) and has an inside edge.

The second state stop (412) is formed on and protrudes radially from the outer edge of the limiting ring (41), corresponds to and selectively abuts the limit (32) to stop rotation of the hinge and subtends a second angle (B).

The at least one first stage limit notch (413) is formed in the inside edge of the through hole (411), and each first stage limit notch (413) has two ends and subtends a third angle (C). The third angle (C) is greater than a combination of the first angle (A) and the second angle (B) (i.e. C>A+B).

The driving ring (42) is mounted around and engages the keyed shaft (20), is mounted rotatably in the through hole (411) of the limiting ring (41) and has an outer edge, a keyed hole (421) and at least one first stage stop (422).

The keyed hole (421) is formed concentrically through the driving ring (42) and engages the keyed shaft (20) so the driving ring (42) rotates with the monitor panel.

Figure 5:
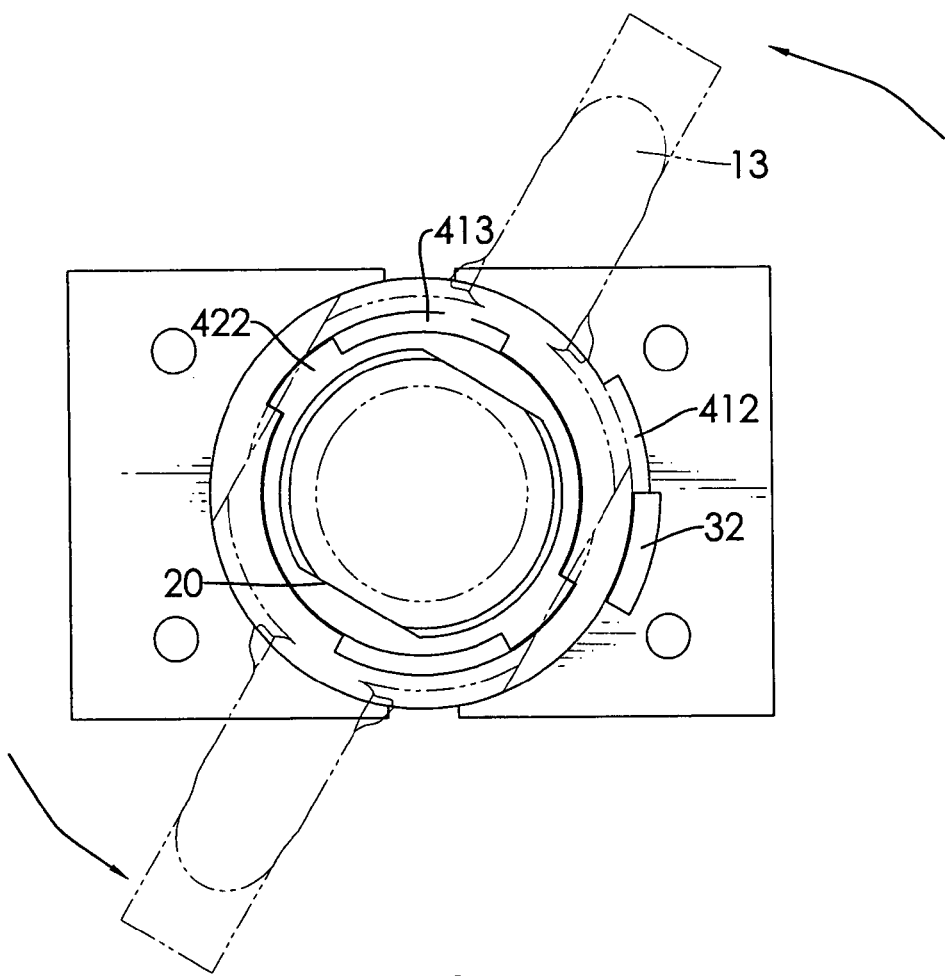
FIG. 5 is an operational top view of rotating elements and associated limits and stops FIG. 4 with the combination bracket rotated through a first stage angle.
Figure 6:
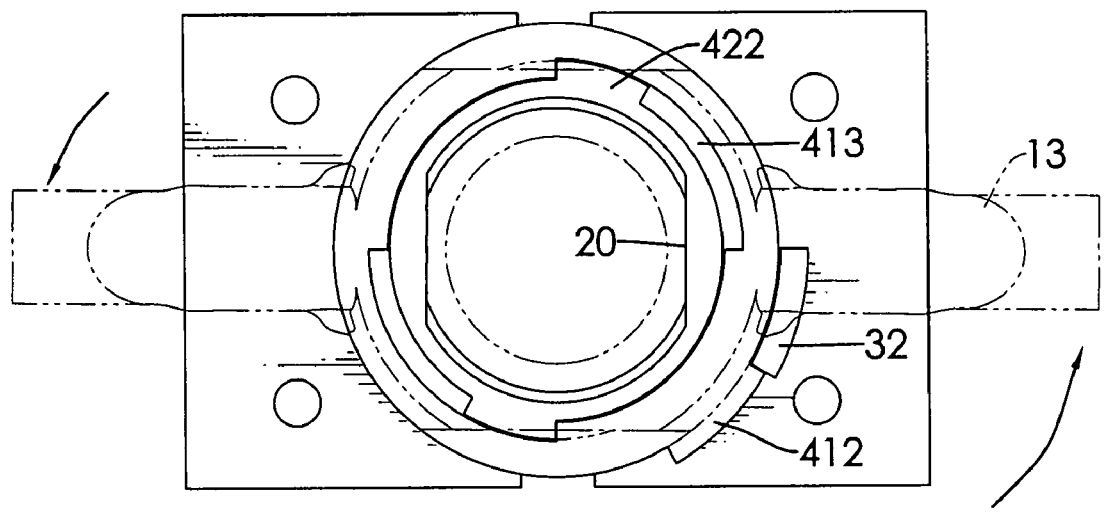
FIG. 6 is an operational top view of the hinge assembly in FIG. 5 with the combination bracket rotated 360°.

With further reference to FIGS. 5 and 6, the at least one first stage stop (422) is formed on and protrudes radially from the outer edge of the driving ring (42), corresponds to and is mounted rotatably in the at least one first stage limit notch (413), selectively abuts ends of the at least one first stage limit notch (413) to rotate the limiting ring (41) and subtends a fourth angle (D). The fourth angle (D) is smaller than the third angle (C) of the first stage limit notch (413), and the third angle (C) minus the fourth angle (D) is equal to the first angle (A) plus the second angle (B) (i.e., C−D=A+B) that allows the keyed shaft (20) to rotate for 360°.

The pressing assembly (50) is mounted around the lower end of the keyed shaft (20) below the stationary bracket (30), holds the limiting assembly (40) in the stationary bracket (30), may press the stationary bracket (30) and the limiting assembly (40) tightly against the flange (22) to provide resistance to rotation of the hinge assembly and may be implemented with a mounting washer (51), a positioning ring (52), a resilient washer (53) and a nut (54).

The mounting washer (51) is mounted rotatably around the keyed shaft (20) below the stationary bracket (40), abuts the stationary bracket (40) and has a bottom surface, an outside edge, at least one mounting tab (511) and at least one detent (512).

The at least one mounting tab (511) is formed on and protrudes up from the mounting washer (51) and corresponds to and engages the at least one mounting notch (34) in the stationary bracket (30).

The at least one detent (512) is formed in the mounting washer (51) and may be a notch or a recess. The notch is formed in the outer edge. The recess is formed in the bottom surface.

The positioning ring (52) is mounted around and engages the keyed shaft (20) below the mounting washer (51), abuts the mounting washer (51) and has a top surface and at least one boss (521).

The at least one boss (521) is formed on and protrudes up from the top surface of the positioning ring (52) and corresponds to and selectively slides into the at least one detent (512) to hold the monitor panel temporarily in position.

The resilient washer (53) is mounted around the keyed shaft (20) below the positioning ring (52) and abuts and presses the positioning ring (52).

The nut (54) is mounted securely around the keyed shaft (20) below the resilient washer (53) and press against the resilient washer (53).

Consequently, the hinge assembly in a notebook computer enlarges a horizontal rotation angle of the monitor panel to 360° relative to the base.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge assembly comprising
a combination bracket having
  a top;
  a bottom; and
  two sides;
a keyed shaft being attached securely below and protruding down from the combination bracket and having
  an upper end;
  a lower end; and
  a middle;
a stationary bracket being mounted rotatably around the keyed shaft and having
  a top surface;
  two edges;
  a pivot hole being formed through the stationary bracket and being mounted rotatably around the lower end of the keyed shaft; and
  a limit being formed on and protruding up from the top surface of the stationary bracket, being curved and concentric with the pivot hole and having a first angle;
a limiting assembly being mounted around the keyed shaft against the top surface of the stationary bracket, corresponding to and selectively abutting the limit and having
  a limiting ring being mounted rotatably around the keyed shaft against the top surface of the stationary bracket and having
    an outer edge;
    a through hole being formed concentrically through the limiting ring, being mounted rotatably around the keyed shaft and having an inside edge;
    a second state stop being formed on and protruding radially from the outer edge of the limiting ring, corresponding to and selectively abutting the limit and subtending a second angle; and
    at least one first stage limit notch being formed in the inside edge of the through hole of the limiting ring, and each one of the at least one first stage limit notch having two ends and subtending a third angle being greater than a combination of the first angle and the second angle; and
  a driving ring being mounted non-rotatably around and engaging the keyed shaft, being mounted rotatably in the through hole of the limiting ring and having
    an outer edge;
    a keyed hole being formed concentrically through the driving ring and engaging the keyed shaft; and
    at least one first stage stop being formed on and protruding radially from the outer edge of the driving ring, corresponding to and being mounted rotatably in the at least one first stage limit notch, selectively abutting ends of the at least one first stage limit notch and subtending a fourth angle being smaller than the third angle of the first stage limit notch, and the third angle minus the fourth angle being equal to the first angle plus the second angle; and a pressing assembly being mounted around the lower end of the keyed shaft below the stationary bracket and holding the limiting assembly in the stationary bracket.

2. The hinge assembly as claimed in claim 1, wherein
the combination bracket further has a keyed recess being formed in the bottom of the combination bracket;
the upper end of the keyed shaft is mounted in and engages the keyed recess;
the keyed shaft further has a flange being formed around and protruding radially from the middle of the keyed shaft and having a bottom surface; and
the limiting assembly abuts the bottom surface of the flange.

3. The hinge assembly as claimed in claim 2, wherein
the combination bracket further has an opening being formed in the top of the combination bracket and communicating with the keyed recess; and
the keyed shaft further has a through hole being formed longitudinally through the keyed shaft and communicating with the opening of the combination bracket.

4. The hinge assembly as claimed in claim 3, wherein
the lower end of the keyed shaft is threaded;
the stationary bracket further has at least one mounting notch, each one of the at least one mounting notch being formed in one of the edges of the stationary bracket; and
the pressing assembly presses the stationary bracket and the limiting assembly against the flange and has
    a mounting washer being mounted rotatably around the keyed shaft below the stationary bracket, abutting the stationary bracket and having
        a bottom surface;
        an outside edge;
        at least one mounting tab being formed on and protruding upward from the mounting washer and corresponding to and engaging the at least one mounting notch in the stationary bracket; and
        at least one detent being formed in the mounting washer;
    a positioning ring being mounted around and engaging the keyed shaft below the mounting washer, abutting the mounting washer and having
        a top surface; and
        at least one boss being formed on and protruding up from the positioning ring and corresponding to and selectively sliding into the at least one detent;
    a resilient washer being mounted around the keyed shaft below the positioning ring and abutting and pressing the positioning ring; and
    a nut being mounted securely around the keyed shaft below the resilient washer and pressing against the resilient ring.

5. The hinge assembly as claimed in claim 4, wherein the combination bracket further has two pivot arms being formed respectively on and protruding from the sides of the combination bracket diametrically opposite to each other.

6. The hinge assembly as claimed in claim 4, wherein the at least one detent of the mounting washer is a notch formed in the outer edge.

7. The hinge assembly as claimed in claim 4, wherein the at least one detent of the mounting washer is a recess formed in the bottom surface.

\* \* \* \* \*